United States Patent
Seong

(10) Patent No.: US 9,025,858 B2
(45) Date of Patent: May 5, 2015

(54) METHOD AND APPARATUS FOR AUTOMATICALLY GENERATING OPTIMAL 2-DIMENSIONAL MEDICAL IMAGE FROM 3-DIMENSIONAL MEDICAL IMAGE

(75) Inventor: Yeong-kyeong Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 13/358,029

(22) Filed: Jan. 25, 2012

(65) Prior Publication Data

US 2012/0189178 A1 Jul. 26, 2012

(30) Foreign Application Priority Data

Jan. 25, 2011 (KR) .................. 10-2011-0007317

(51) Int. Cl.
*G06K 9/00* (2006.01)
*G06T 19/00* (2011.01)
*G06T 11/00* (2006.01)

(52) U.S. Cl.
CPC .............. *G06T 19/00* (2013.01); *G06T 11/008* (2013.01); *G06T 2219/008* (2013.01)

(58) Field of Classification Search
CPC ................................................ G06T 2219/008
USPC .................................................. 382/131, 132
See application file for complete search history.

(56) References Cited

U.S. PATENT DOCUMENTS

| | | | |
|---|---|---|---|
| 6,413,219 B1 | 7/2002 | Avila et al. | |
| 7,003,175 B2 * | 2/2006 | Paladini | 382/276 |
| 7,715,626 B2 * | 5/2010 | Florin et al. | 382/173 |
| 7,929,741 B2 * | 4/2011 | Guiliguian et al. | 382/128 |
| 8,009,936 B2 * | 8/2011 | Oosawa et al. | 382/128 |
| 8,135,185 B2 * | 3/2012 | Blume et al. | 382/128 |
| 8,213,699 B2 * | 7/2012 | Wakai et al. | 382/131 |
| 8,571,288 B2 * | 10/2013 | Sugiura | 382/131 |
| 2006/0229513 A1 * | 10/2006 | Wakai | 600/407 |
| 2007/0274582 A1 | 11/2007 | Yatziv et al. | |
| 2008/0009722 A1 | 1/2008 | Simopoulos et al. | |
| 2008/0114244 A1 * | 5/2008 | Murashita et al. | 600/443 |

(Continued)

FOREIGN PATENT DOCUMENTS

| | | |
|---|---|---|
| JP | 2005-261932 A | 9/2005 |
| KR | 10-2003-0070324 A | 8/2003 |

(Continued)

OTHER PUBLICATIONS

D. Pham et al., "Current Methods in Medical Image Segmentation," *Annual Review of Biomedical Engineering*, vol. 2, Aug. 2000, pp. 315-337.

(Continued)

*Primary Examiner* — Anand Bhatnagar
*Assistant Examiner* — Soo Park
(74) *Attorney, Agent, or Firm* — NSIP Law

(57) ABSTRACT

In a method and an apparatus for automatically generating an optimal 2-dimensional (2D) medical image from a 3D medical image, at least one virtual plane crossing a 3D volume is generated from 3D volume image data for showing part of a patient's body in a 3D manner, at least one 2D image representing a cross section of the part of the patient's body is generated by applying the 3D volume image data to the virtual plane, and a 2D image suitable for diagnosis of the patient having a feature most similar to a target feature from among the at least one 2D image is output.

18 Claims, 13 Drawing Sheets

(56) References Cited

U.S. PATENT DOCUMENTS

| | | | |
|---|---|---|---|
| 2008/0298660 A1* | 12/2008 | Yamagata | 382/131 |
| 2009/0054776 A1 | 2/2009 | Sasaki | |
| 2009/0175519 A1* | 7/2009 | Iizuka et al. | 382/128 |
| 2009/0303252 A1* | 12/2009 | Hyun et al. | 345/643 |
| 2010/0121189 A1* | 5/2010 | Ma et al. | 600/437 |
| 2012/0209106 A1* | 8/2012 | Liang et al. | 600/414 |
| 2012/0253173 A1* | 10/2012 | Endo et al. | 600/411 |
| 2012/0316441 A1* | 12/2012 | Toma et al. | 600/441 |
| 2013/0004048 A1* | 1/2013 | Tsujii et al. | 382/131 |

FOREIGN PATENT DOCUMENTS

| | | | |
|---|---|---|---|
| KR | 10-2004-0024509 A | 3/2004 | |
| KR | 10-2007-0021420 A | 2/2007 | |
| KR | 10-2007-0082138 A | 8/2007 | |
| KR | 10-2007-0083388 A | 8/2007 | |
| KR | 10-2010-0071595 A | 6/2010 | |

OTHER PUBLICATIONS

C. Baillard et al., "Robust Adaptive Segmentation of 3D Medical Images with Level Sets," *Rapports de recherche*, No. 4071, Nov. 2000, pp. 1-26, INRIA.

M. Seo et al., "ROI-Based Medical Image Retrieval Method Using Human-Perception and MPEG-7 Visual Descriptors," *Proceedings of the 5th International Conference on Image and Video Retrieval (CIVR 2006)*, Jul. 13-15, 2006, Tempe, AZ, *Lecture Notes in Computer Science*, vol. 4071, 2006, pp. 231-240.

M. Seo et al., "ROI-based Medical Image Retrieval Method using Human Perception and MPEG-7 Visual Descriptor," *Journal of Korean Society for Imaging Science and Technology*, vol. 13, No. 2, Jun. 2007, pp. 120-130 (in Korean, including English abstract).

* cited by examiner

METHOD AND APPARATUS FOR AUTOMATICALLY GENERATING OPTIMAL 2-DIMENSIONAL MEDICAL IMAGE FROM 3-DIMENSIONAL MEDICAL IMAGE

CROSS-REFERENCE TO RELATED APPLICATIONS

This application claims the benefit of Korean Patent Application No. 10-2011-0007317 filed on Jan. 25, 2011, in the Korean Intellectual Property Office, the disclosure of which is incorporated herein by reference in its entirety.

BACKGROUND

1. Field

This disclosure relates to methods and apparatuses for generating an optimal 2-dimensional (2D) medical image from a 3-dimensional (3D) medical image.

2. Description of the Related Art

Various types of medical equipment for diagnosing patients are in use or are being developed. In terms of patient convenience in a patient diagnosing process and the speed of obtaining patient diagnosis results, medical equipment, such as Computed Tomography (CT) and Magnetic Resonance Imaging (MRI), for showing an image of a cross section of the inside of a human body, is very important. Lately, according to the rapid development of medical equipment, medical equipment for outputting a 3-dimensional (3D) image of the inside of a human body has become available in the market.

SUMMARY

A method and an apparatus for generating a 2-dimensional (2D) medical image optimal for diagnosing a patient from a 3-dimensional (3D) medical image.

A computer-readable recording medium storing a computer program for controlling a computer to perform the method.

According to an aspect of the invention, a method of generating a 2-dimensional (2D) image includes receiving 3-dimensional (3D) volume image data for showing part of a patient's body in a 3D manner, generating at least one virtual plane crossing the 3D volume, generating at least one 2D image representing a cross section of the part of the patient's body by applying the 3D volume image data to the at least one virtual plane, and outputting a 2D image having a feature most similar to a target feature from among the at least one 2D image.

According to an aspect of the invention, a computer-readable recording medium stores a computer program for controlling a computer to perform the method of generating a 2-dimensional (2D) image.

According to an aspect of the invention, an apparatus for generating a 2-dimensional (2D) image includes an input unit configured to receive 3-dimensional (3D) volume image data for showing part of a patient's body in a 3D manner, an image processor configured to generate at least one virtual plane crossing the 3D volume, and generate at least one 2D image representing a cross section of the part of the patient's body by applying the 3D volume image data to the at least one virtual plane, and an output unit configured to output a 2D image having a feature most similar to a target feature from among the at least one 2D image.

Additional aspects will be set forth in part in the description that follows and, in part, will be apparent from the description, or may be learned by practice of the described embodiments.

BRIEF DESCRIPTION OF THE DRAWINGS

The above and/or other aspects will become apparent and more readily appreciated from the following description of embodiments of the invention, taken in conjunction with the accompanying drawings of which.

DETAILED DESCRIPTION

Figure 1:
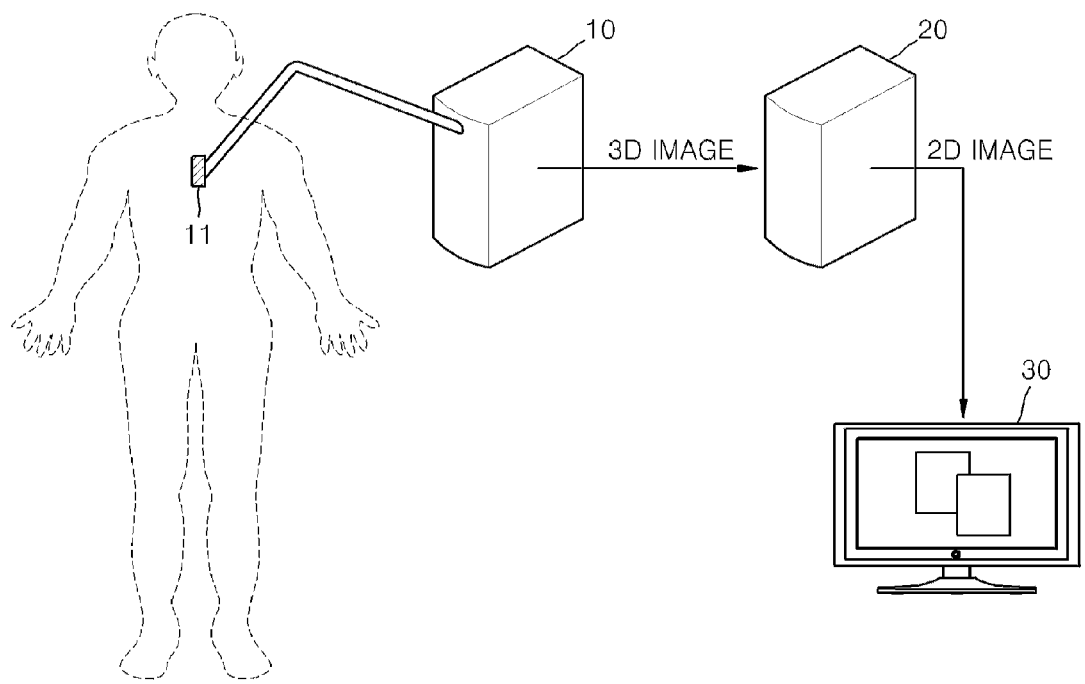
FIG. 1 is a configuration diagram of a patient diagnosis system according to an embodiment of the invention.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain various aspects.

FIG. 1 is a configuration diagram of a patient diagnosis system according to an embodiment of the invention. Referring to FIG. 1, the patient diagnosis system includes a 3-dimensional (3D) image detecting apparatus 10, a 2-dimensional (2D) image generating apparatus 20, and an image display apparatus 30. The 3D image detecting apparatus 10 generates 3D volume image data for showing a predetermined part of a patient's body in a 3D manner by using a reaction that occurs by delivering a source signal generated by a probe 11 included in the 3D image detecting apparatus 10 to the predetermined part of the patient's body that a medical expert, such as a doctor, desires to diagnose. The source signal may be various signals, such as an ultrasound and an X ray. A case where the 3D image detecting apparatus 10 is an ultrasonography machine for detecting a 3D image from the patient's body using ultrasound will now be described as an example.

The probe 11 of the ultrasonography machine may include a piezoelectric transducer. When ultrasound in a range from about 2 MHz to about 18 MHz is delivered to the predetermined part of the patient's body by the probe 11 of the 3D image detecting apparatus 10, the ultrasound is partially reflected from layers between various different tissues. In particular, the ultrasound is reflected from the inside of the patient's body (having a density change), e.g., blood cells in blood plasma and small structures in organs. The reflected ultrasound vibrates the piezoelectric transducer of the probe 11, and the probe 11 outputs electrical pulses according to the vibration. These electrical pulses are converted into an image.

The 3D image detecting apparatus 10 detects a plurality of cross-sectional images of the predetermined part of the patient's body while changing a location and orientation of the probe 11 on the patient's body. Thereafter, the 3D image detecting apparatus 10 generates 3D volume image data for showing the predetermined part of the patient's body in a 3D manner by stacking these cross-sectional images. Such a method of generating 3D volume image data by stacking cross-sectional images is called a multiplanar reconstruction method. A feature of the embodiments described below is to obtain a 2D image that is optimal for diagnosing a patient from a 3D image rather than to generate the 3D image. Thus, the above-described process of generating a 3D image by multiplanar reconstructing using ultrasound is only an example, and the embodiments described below may be applied to 3D images generated using various methods.

Such a generated image of a 3D volume has low visibility with respect to an organ or tissue located inside the 3D volume since at least one part of the patient's body is shown in a 3D manner. Furthermore, medical experts, such as doctors, are more familiar with diagnosis using 2D images rather than 3D images. Accordingly, a 2D image optimal for diagnosing a patient needs to be extracted from an image of a 3D volume. However, since the number of 2D images extractable from the 3D volume is infinite, it would be more effective if the 2D image optimal for diagnosing a patient could be searched for and automatically extracted without intervention of a user. The embodiments described below provide methods of effectively and automatically extracting a 2D image optimal for diagnosing a patient from an image of a 3D volume.

Figure 2:
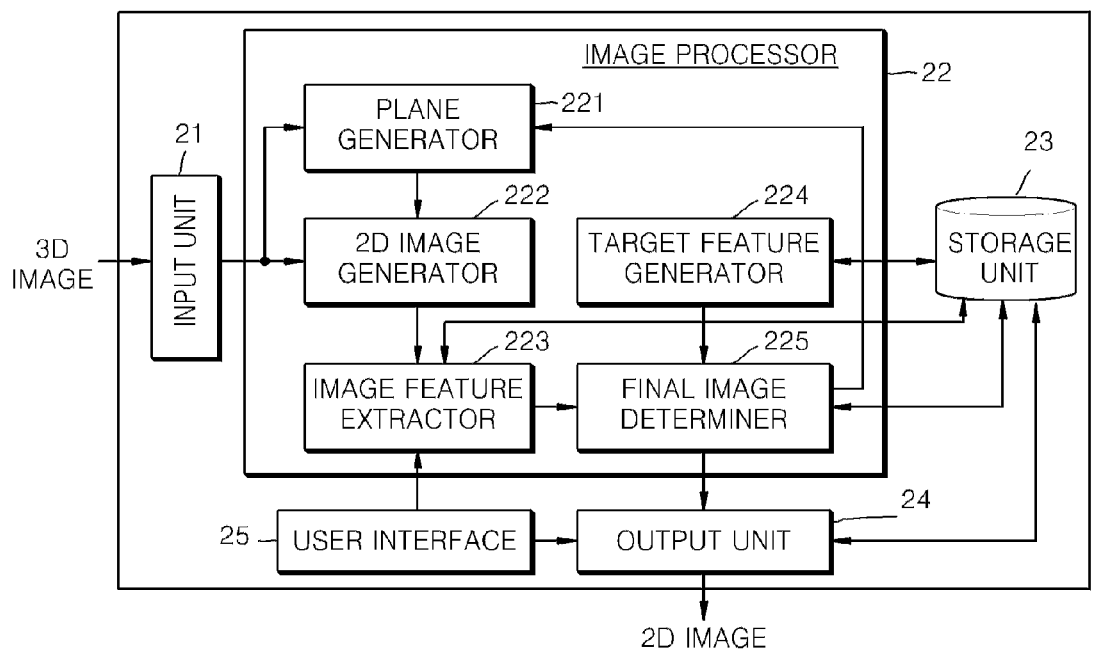
FIG. 2 is a block diagram of a 2D image generating apparatus shown in FIG. 1.

FIG. 2 is a block diagram of the 2D image generating apparatus 20 shown in FIG. 1. Referring to FIG. 2, the 2D image generating apparatus 20 includes an input unit 21, an image processor 22, a storage unit 23, an output unit 24, and a user interface 25. The input unit 21 receives 3D volume image data for showing a part of the body of a patient in a 3D manner from the 3D image detecting apparatus 10, and delivers the 3D volume image data to the image processor 22. The output unit 24 receives a 2D image representing a cross section of the part of the patient's body that is generated by the image processor 22, and outputs the 2D image to the image display apparatus 30. The input unit 21 and the output unit 24 may be an interface for connecting the image processor 22 to the 3D image detecting apparatus 10 and an interface for connecting the image processor 22 to the image display apparatus 30, respectively. The user interface 25 is an interface for receiving a command or information from a user, such as a medical expert. The user interface 25 may be an input device, such as a keyboard or a mouse, or a Graphic User Interface (GUI) displayed on the image display apparatus 30.

The image processor 22 generates a 2D image optimal for diagnosing the patient from among 2D images crossing the 3D volume by processing the 3D volume image data input to the input unit 21. Referring to FIG. 2, the image processor 22 includes a plane generator 221, a 2D image generator 222, an image feature extractor 223, a target feature generator 224, and a final image determiner 225. The image processor 22 may be manufactured with dedicated chips for performing functions of the components listed above, or may be implemented by a general central processing unit (CPU) and a dedicated program stored in the storage unit 23.

The plane generator 221 generates at least one virtual plane in a 3D space that crosses the 3D volume from the 3D volume image data input to the input unit 21. In particular, the plane generator 221 generates at least one virtual plane crossing the 3D volume according to a predetermined method of searching for a plane in a 3D space. Examples of the predetermined method include a full search method, a random walk method, and a search method using principal component analysis (PCA), i.e., a principal component search method. The method of searching for a plane is not limited to the examples listed above, and various methods that are known in the art may be applied to the method of searching for a plane.

The full search method is a method of searching for a final plane while sequentially generating all possible planes crossing the 3D volume. The random walk method is a method of generating random candidate planes crossing the 3D volume, and searching for a final plane while gradually reducing a range of candidate planes based on the generated random candidate planes. The principal component search method is a method of generating an initial plane crossing the 3D volume by performing PCA on the 3D volume image data, and searching for a final plane based on the initial plane. The final plane is a plane including the 2D image optimal for diagnosing the patient from among the planes crossing the 3D volume.

An example of searching for a virtual plane by using the full search method in the plane generator 221 will now be described. The plane generator 221 generates a virtual plane by calculating an equation of a plane crossing a 3D volume by using a plane equation as shown in Equation 1 below. Equation 1 is an equation of a plane passing through a 3D spatial point $(i_d, j_d, k_d)$ and perpendicular to a vector $(1, p_d, q_d)$. The plane generator 221 sequentially calculates equations of all possible planes crossing the 3D volume by sequentially changing the gradient values $p_d$ and $q_d$ and the central coordinate values $i_d, j_d$, and $k_d$ in Equation 1.

$$(i-i_d)+p_d(j-j_d)+q_d(k-k_d)=0 \qquad (1)$$

Figure 3A:
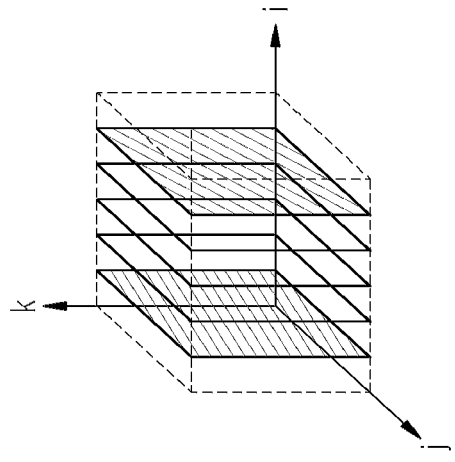
FIGS. 3A-3C show a process of generating a virtual plane according to a full search method in a plane generator shown in FIG. 2.
Figure 3B:
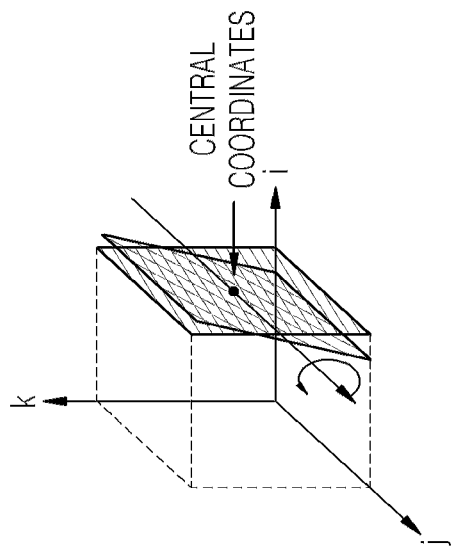
Figure 3C:
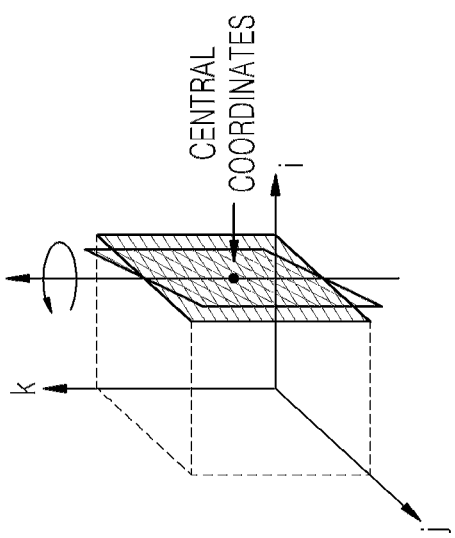

FIGS. 3A-3C show a process of generating a virtual plane according to the full search method in the plane generator 221 shown in FIG. 2. In particular, FIG. 3A shows planes crossing the 3D spatial point $(i_d, j_d, k_d)$ (central coordinates) and rotating in a range from about −90° to about +90° about an axis of a vector perpendicular to an ij plane when $p_d$ is changed while the other coefficient values are fixed in Equation 1. FIG. 3B shows planes crossing the 3D spatial point $(i_d, j_d, k_d)$ and rotating in a range from about −90° to about +90° about an axis of a vector perpendicular to an ik plane when $q_d$ is changed while the other coefficient values are fixed in Equation 1. FIG. 3C shows planes including the 3D spatial point $(i_d, j_d, k_d)$ when $i_d$ is changed while the other coefficient values are fixed in Equation 1. Even when another coefficient $j_d$ or $k_d$ of the central coordinates is changed, planes including the 3D spatial point $(i_d, j_d, k_d)$ may be generated in a method similar to a method of generating the planes shown in FIG. 3C.

Figure 4:
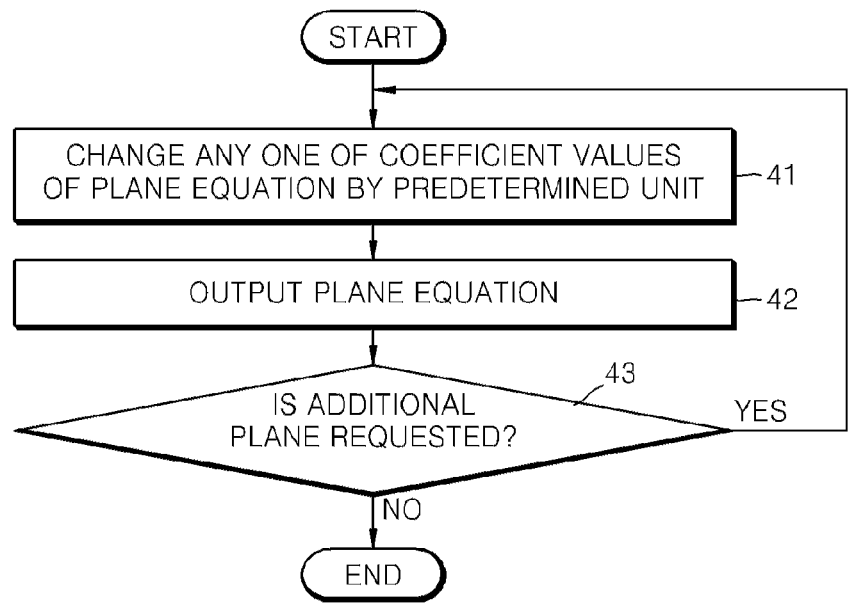
FIG. 4 is a flowchart of the process of generating a virtual plane according to the full search method in the plane generator shown in FIG. 2.

FIG. 4 is a flowchart of the process of generating a virtual plane according to the full search method in the plane generator 221 shown in FIG. 2. Referring to FIG. 4, the process of generating a virtual plane according to the full search method in the plane generator 221 includes the following operations. In operation 41, the plane generator 221 changes any one of coefficient values of the plane equation as shown in Equation 1 by a predetermined unit. For example, the plane generator 221 may change a gradient value $p_d$ or $q_d$ of the plane equation as shown in Equation 1 by a predetermined unit u1 in a range of values corresponding to a range of about −90° to about +90°, and changes a central coordinate value $i_d$, $j_d$, or $k_d$ by a predetermined unit u2 in a range of the 3D volume. The change in the gradient value $p_d$ or $q_d$ by the predetermined unit u1 and the change in the central coordinate value $i_d$, $j_d$, or $k_d$ by the predetermined unit u2 are an increase or decrease of the gradient value $p_d$ or $q_d$ by the predetermined unit u1 and an increase or decrease of the central coordinate value $i_d$, $j_d$, or $k_d$ by the predetermined unit u2, respectively.

In operation 42, the plane generator 221 outputs the plane equation generated in operation 41 to the 2D image generator 222. In operation 43, if a signal indicating a request for an additional plane is input from the final image determiner 225, the plane generator 221 proceeds back to operation 41. Otherwise, if no signal indicating a request for an additional plane is input from the final image determiner 225, that is, if a final image is determined by the final image determiner 225, the plane generator 221 ends the full search method. By changing the coefficient values of the plane equation as shown in Equation 1 one by one every time the plane generator 221 proceeds back to operation 41, equations of all possible planes crossing the 3D volume may be sequentially calculated. As the sizes of the units u1 and u2 decrease, a more precise plane may be obtained. However, in this case, a computation amount of the image processor 22 may increase. Thus, the units u1 and u2 may be determined properly in consideration of the performance of the image processor 22.

When the plane generator 221 calculates the equations of all possible planes crossing the 3D volume in the method described above, this may become too much of a load on the image processor 22 and take a long time until an optimal plane is found. Thus, it will be understood by those of ordinary skill in the art to which the embodiment shown in FIG. 2 belongs that an existing search algorithm, such as dynamic programming or a tree search, may be applied to the method described above to reduce a load on the image processor 22 and reduce a plane search time.

An example of searching for a virtual plane by using the random walk method in the plane generator 221 will now be described. In the random walk method, the plane generator 221 repeats a predetermined number of times a process of generating candidate planes crossing the 3D volume, selecting some candidate planes from among the generated candidate planes, and generating new candidate planes in a range of the selected candidate planes.

Figure 5:
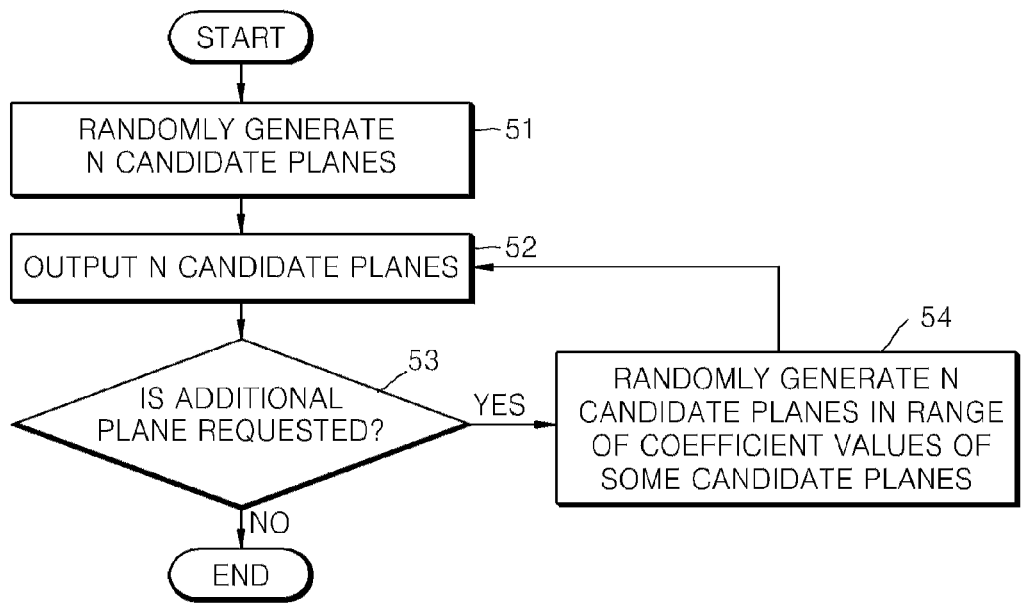
FIG. 5 is a flowchart of a process of generating a virtual plane according to a random walk method in the plane generator shown in FIG. 2.

FIG. 5 is a flowchart of a process of generating a virtual plane according to the random walk method in the plane generator 221 shown in FIG. 2. Referring to FIG. 5, the process of generating a virtual plane according to the random walk method in the plane generator 221 includes the following operations. In operation 51, the plane generator 221 randomly generates N candidate planes by randomly selecting coefficient values of Equation 1. In operation 52, the plane generator 221 outputs the N candidate planes generated in operation 51 to the 2D image generator 222. In operation 53, if a signal indicating a request for an additional plane is input from the final image determiner 225, the plane generator 221 proceeds to operation 54. Otherwise, if no signal indicating a request for an additional plane is input from the final image determiner 225, that is, if a final image is determined by the final image determiner 225, the plane generator 221 ends the random walk method.

In operation 54, the plane generator 221 generates N candidate planes by randomly reselecting coefficient values of Equation 1 in a range of coefficient values of some candidate planes indicated by information input from the final image determiner 225 from among the N candidate planes. When a signal indicating a request for an additional plane is input from the final image determiner 225, information regarding some candidate planes having a relatively higher similarity between a target feature generated by the target feature generator 224 and a feature of each of the candidate planes generated in operation 51 or 54 from among the N candidate planes is input together with this signal. If the generation of the N candidate planes is completed in operation 54, the plane generator 221 proceeds back to operation 52 to output the N candidate planes generated in operation 54 to the 2D image generator 222. The image processor 22 determines a plane having the highest similarity among the N candidate planes as a final plane after repeatedly performing operations 52 to 54 a predetermined number of times, e.g., 2 or 3 times.

Figure 6:
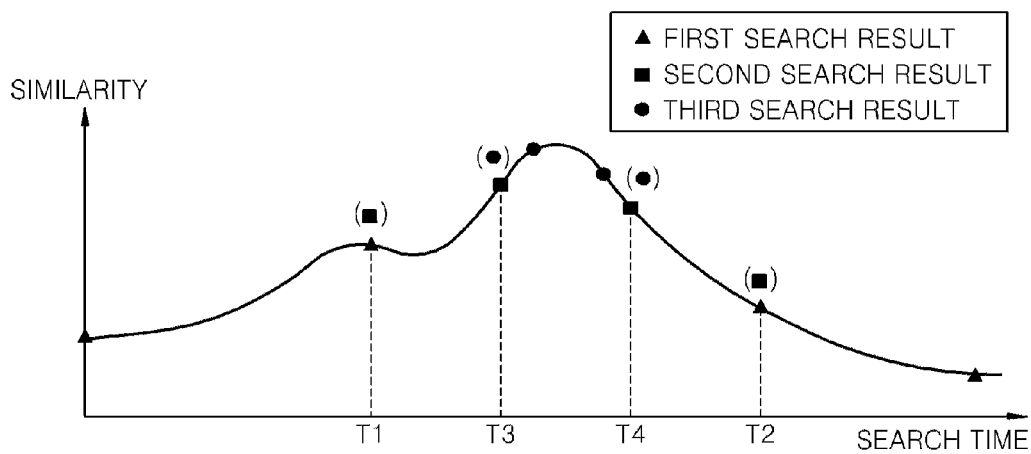
FIG. 6 is a graph for explaining an example of a process of selecting a virtual plane according to the random walk method in the plane generator shown in FIG. 2.

FIG. 6 is a graph for explaining an example of a process of selecting a virtual plane according to the random walk method in the plane generator 221 shown in FIG. 2. In the graph shown in FIG. 6, the horizontal axis represents a search time according to the random walk method, and the vertical axis represents a similarity between a target feature and a feature of each candidate plane. As shown in FIG. 6, the plane generator 221 generates 4 candidate planes at once. The image processor 22 determines a plane having the highest similarity among the 4 candidate planes, i.e., candidates planes marked with dots in FIG. 6, selected after repeating operations 52 to 54 3 times as a final plane.

According to the random walk method shown in FIG. 6, first, by randomly selecting coefficient values of Equation 1, 4 candidate planes marked with a triangle are generated. Second, a range of coefficient values of 2 planes having a higher similarity than others among the 4 candidate planes marked with a triangle is extracted. This range corresponds to a range of coefficient values of planes found within a search time range T1 to T2 as shown in FIG. 6. Third, by randomly reselecting coefficient values of Equation 1 in the extracted range of coefficient values, 4 candidate planes marked with a rectangle are generated. Fourth, a range of coefficient values of 2 planes having a higher similarity than others among the 4 candidate planes marked with a rectangle is extracted. This range corresponds to a range of coefficient values of planes found within a search time range T3 to T4 as shown in FIG. 6. By repeating the above-described procedures, a plane having the highest similarity among candidate planes marked with a dot in FIG. 6 is determined as a final plane.

The graph shown in FIG. 6 is obtained by estimating similarities of all planes based on similarities of candidate planes found in a plurality of search processes including a first search process, a second search process, and a third search process. In particular, although the search time range T3 to T4 temporally comes after the search time range T1 to T2, since a second search is performed in a range of coefficient values of planes found in a first search, the search time range T3 to T4 is shown within the search time range T1 to T2. In addition, although 2 candidate planes having a higher similarity than others among 4 candidate planes in a previous search are reselected as candidate planes in a next search in FIG. 6, this is only an example, and candidate planes in a next search may be selected by using another method in a range of coefficient values determined in a previous search.

An example of searching for a virtual plane by using a PCA method in the plane generator 221 will now be described. The plane generator 221 generates at least one virtual plane according to a change pattern of the 3D volume image data input to the input unit 21 in a 3D space by performing the PCA on the 3D volume image data. In more detail, the plane generator 221 calculates a first principal component vector corresponding to an axis in a direction in which a change in the 3D volume image data is the greatest in the 3D space by performing the PCA on the 3D volume image data input to the input unit 21, and generates at least one virtual plane based on the first principal component vector.

For example, if the first principal component vector and a second principal component vector are determined through the PCA of the 3D volume image data, the plane generator 221 calculates a plane including the first principal component vector and the second principal component vector. The second principal component vector indicates an axis in a direction in which a change in the 3D volume image data is the second greatest in the 3D space. Since principal component vectors indicate axes in respective directions in the 3D space, a single plane may be specified by two of the principal component vectors. Although this plane corresponds to a plane having the greatest change in the 3D volume image data according to the PCA, since the PCA is a kind of a statistical analysis method, the PCA may not be perfectly correct. In consideration of this, the plane generator 221 may further calculate at least one principal component vector besides the first and second principal component vectors and search for a final plane in a method of generating a plurality of planes from a set of three or more principal component vectors.

Figure 7:
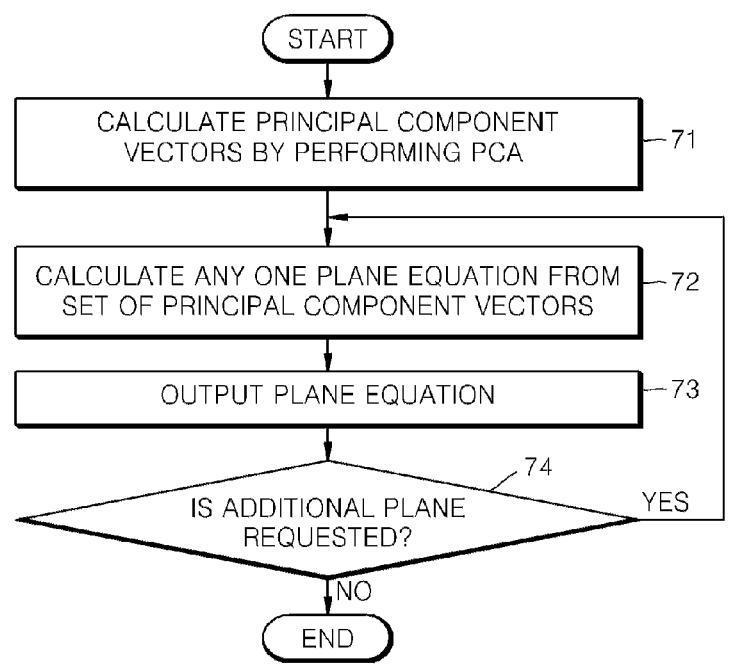
FIG. 7 is a flowchart of a process of generating a virtual plane according to a principal component search method in the plane generator shown in FIG. 2.

FIG. 7 is a flowchart of a process of generating a virtual plane according to the principal component search method in the plane generator 221 shown in FIG. 2. Referring to FIG. 7, the process of generating a virtual plane according to the principal component search method in the plane generator 221 includes the following operations. In operation 71, the plane generator 221 calculates the first principal component vector, the second principal component vector, and a third principal component vector by performing the PCA on the 3D volume image data input to the input unit 21. The third principal component vector indicates an axis in a direction in which a change in the 3D volume image data is the third greatest in the 3D space. In operation 72, the plane generator 221 calculates any one plane equation from a set of the first principal component vector, the second principal component vector, and the third principal component vector. In operation 73, the plane generator 221 outputs the plane equation generated in operation 72. In operation 74, if a signal indicating a request for an additional plane is input from the final image determiner 225, the plane generator 221 proceeds back to operation 72. Otherwise, if no signal indicating a request for an additional plane is input from the final image determiner 225, the plane generator 221 ends the principal component search method.

When the plane generator 221 proceeds to operation 72, the plane generator 221 first calculates a plane including the first principal component vector and the second principal component vector. Thereafter, the plane generator 221 may calculate an additional plane by parallel moving the plane including the first principal component vector and the second principal component vector in a direction of the third principal component vector every time the plane generator 221 proceeds back to operation 72. Alternatively, when the plane generator 221 proceeds to operation 72, the plane generator 221 may first calculate a plane including the first principal component vector and the third principal component vector. Thereafter, the plane generator 221 may calculate an additional plane by parallel moving the plane including the first principal component vector and the third principal component vector in a direction of the second principal component vector every time the plane generator 221 proceeds back to operation 72. Alternatively, when the plane generator 221 proceeds to operation 72, the plane generator 221 may first calculate a plane including the second principal component vector and the third principal component vector. Thereafter, the plane generator 221 may calculate an additional plane by parallel moving the plane including the second principal component vector and the third principal component vector in a direction of the first principal component vector every time the plane generator 221 proceeds back to operation 72. Alternatively, every time the plane generator 221 proceeds back to operation 72, the plane generator 221 may calculate an additional plane by rotating an arbitrary plane including the first principal component vector about an axis of the first principal component vector.

Figure 8A:
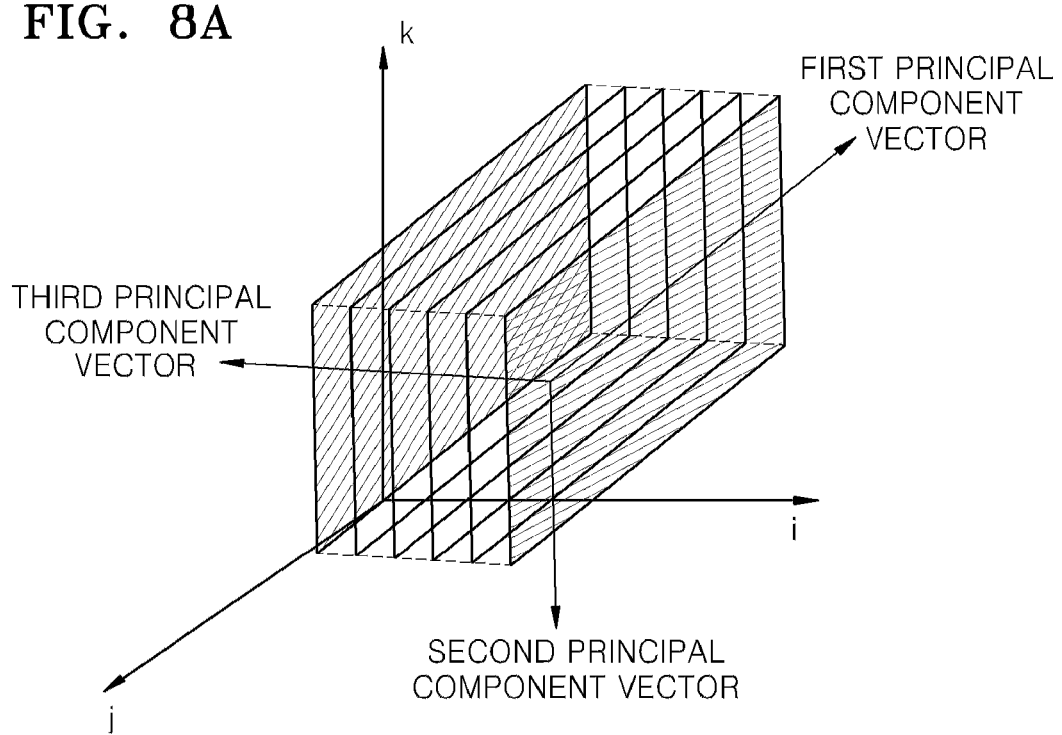
FIGS. 8A and 8B show a process of generating a virtual plane according to a search method using principal component analysis (PCA) in the plane generator shown in FIG. 2.
Figure 8B:
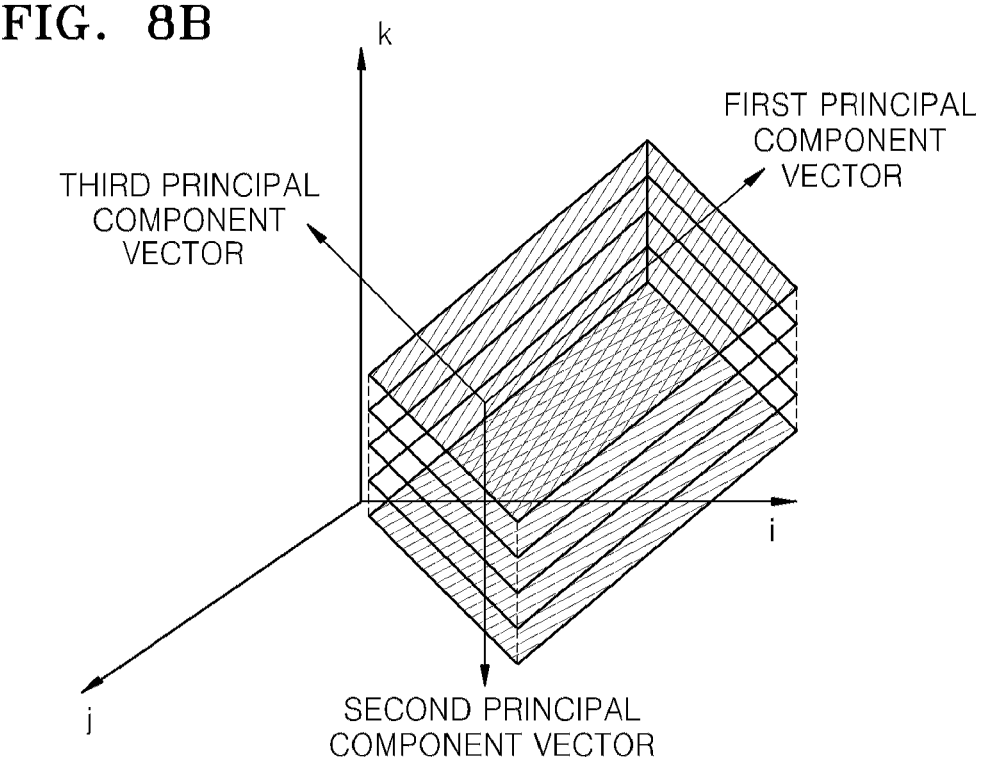

FIGS. 8A and 8B show a process of generating a virtual plane according to the search method using the PCA in the plane generator 221 shown in FIG. 2. The first plane shown in FIG. 8A is a plane including the first principal component vector and the second principal component vector. The other planes are planes generated by parallel moving the plane including the first principal component vector and the second principal component vector in the direction of the third principal component vector. The first plane shown in FIG. 8B is a plane including the first principal component vector and the third principal component vector. The other planes are planes generated by parallel moving the plane including the first principal component vector and the third principal component vector in the direction of the second principal component vector. A virtual plane may also be generated in a similar way according other search methods using the PCA.

The plane generator 221 may generate at least one virtual plane according to a change pattern of the 3D volume image data in the 3D space by performing 2D PCA on the 3D volume image data input to the input unit 21. In more detail, the plane generator 221 may calculate a plane having the greatest change in the 3D volume image data in the 3D space by performing the 2D PCA on the 3D volume image data input to the input unit 21 and generate at least one virtual plane based on the calculated plane. The plane generator 221 may determine the plane having the greatest change in the 3D volume image data as a final plane, or generate additional planes by moving the calculated plane in a predetermined direction, e.g., a direction perpendicular to the calculated plane.

As described above, the 3D image detecting apparatus 10 generates 3D volume image data for showing a predetermined part of a patient's body in a 3D manner by stacking a plurality of cross-sectional images converted from electrical pulses output by the probe 11. Since the electrical pulses output by the probe 11 are mapped to brightness values of pixels, the plurality of cross-sectional images are monochrome images. Thus, the 3D volume image data generated by the 3D image detecting apparatus 10 represents a 3D monochrome image, and includes brightness values of coordinate points included in the predetermined part of the patient's body in a 3D coordinate system. Points having image information in a 2D space are called pixels, and points having image information in a 3D space are called voxels. However, if a color image in a 3D space is output from the 3D image detecting apparatus 10, the 3D volume image data input to the input unit 21 may include color values besides the brightness values of the coordinate points in the 3D coordinate system.

Figure 9A:
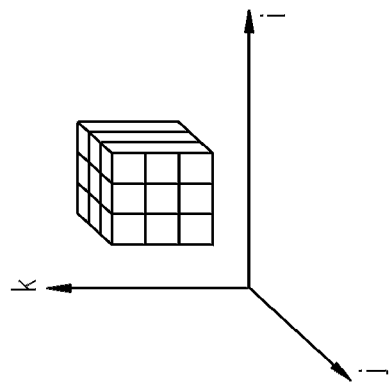
FIGS. 9A-9C show a process of determining a principal component vector in the plane generator shown in FIG. 2.
Figure 9B:
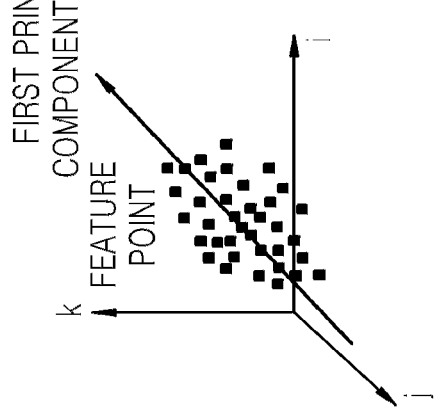
Figure 9C:
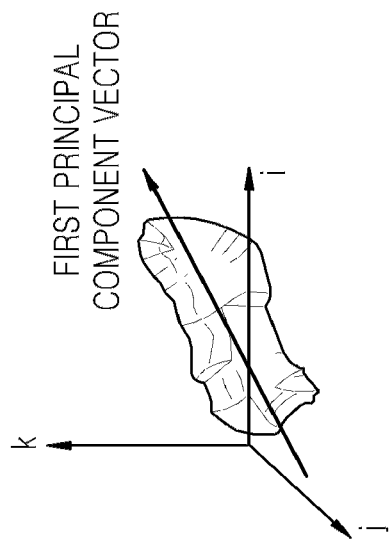

FIGS. 9A-9C show a process of determining a principal component vector in the plane generator 221 shown in FIG. 2. Referring to FIG. 9A, the plane generator 221 detects a mass included in the 3D volume based on voxel values of the 3D volume image data input to the input unit 21, and calculates a principal component vector from a distribution of points included in the mass in a 3D space. The mass is an object included in a 3D volume represented by image data input to the input unit 21. When a 3D volume includes a mass, voxel values may be significantly changed in a boundary part of the mass. However, anatomical tissues are not homogeneous, and boundaries of the anatomical tissues are not clearly defined in an image in most cases. In addition, information regarding a form or an image characteristic of a predetermined tissue that a medical expert desires to diagnose may be necessary.

There are various methods of segmenting a mass in a 3D medical image, such as a level set method. For example, the plane generator 221 may segment the mass included in the 3D volume based on the voxel values of the 3D volume image data input to the input unit 21 by using the level set method. The segmentation of a 3D medical image using the level set method is described in detail in various papers, e.g., C. Baillard et al., "Robust Adaptive Segmentation of 3D Medical Images with Level Sets," *Rapports de recherche*, No. 4071, November 2000, pp. 1-26, INRIA, the contents of which are incorporated herein by reference.

Referring to FIG. 9B, the plane generator 221 identifies points having a feature, such as a form or an image characteristic of a predetermined tissue that a medical expert desires to diagnose, from among the voxels of the 3D volume image data input to the input unit 21 based on the values of the voxels, and calculates a principal component vector from a distribution of the identified points in a 3D space. This method may be usually applied to a case where a voxel set that may be considered as a mass in a 3D medical image does not exist. Alternatively, the plane generator 221 may try the mass segmentation method described above, and then calculate a principal component vector using the method described in FIG. 9B according to a result of the mass segmentation method. However, the plane generator 221 may calculate a principal component vector using only the method described in FIG. 9B.

Referring to FIG. 9C, the plane generator 221 may calculate a feature of any one of the voxels of the 3D volume image data input to the input unit 21 by using a voxel set having a predetermined size in which a voxel is located at the center of the voxel set. FIG. 9C shows a voxel set in a shape of a cube including 27 voxels in which a predetermined voxel is located at the center of the voxel set. For example, the plane generator 221 may determine a mean value of brightness values of the 27 voxels forming the voxel set as a feature of the center voxel of the voxel set. Alternatively, the plane generator 221 may determine a variance of the brightness values of the 27 voxels forming the voxel set as the feature of the center voxel of the voxel set.

Furthermore, brightness values of voxels in a time domain may be transformed to coefficient values of the voxels in a frequency domain, i.e., frequency values of the voxels, by a Discrete Cosine Transform (DCT) or the like. A frequency of a voxel located in an area having a great image change, such as a great brightness change inside an image, is high, while a frequency of a voxel located in an area having a small image change is low. Accordingly, the plane generator 221 may determine a frequency of each voxel as the feature of each voxel. Thus, the plane generator 221 may obtain a feature of each voxel from a set of a mean, a variance, and a frequency of the voxel. Different weights may be applied to the mean, the variance, and the frequency of the voxel.

The plane generator 221 may identify points having a feature, such as a form or an image characteristic of a predetermined tissue that a medical expert desires to diagnose, from among the voxels of the 3D volume image data input to the input unit 21 based on the values of the voxels, and calculate a principal component vector from a distribution of the identified points in a 3D space. This method may be usually applied to a case where a voxel set that may be considered as a mass in a 3D medical image does not exist. Alternatively, the plane generator 221 may try the mass segmentation method described above, and then calculate a principal component vector using the method described in FIG. 9C according to a result of the mass segmentation method. However, the plane generator 221 may calculate a principal component vector using only the method described in FIG. 9C.

The PCA of the 3D volume image data input to the input unit 21 may be performed using various schemes, such as a covariance matrix and singular value decomposition. Hereinafter, a process of performing the PCA by using a covariance matrix in the plane generator 221 will be described. However, it will be understood by those of ordinary skill in the art to which the embodiment shown in FIG. 2 belongs that the plane generator 221 may perform the PCA by using another scheme different from the covariance matrix. For example, the PCA may be performed by weighting each of the voxels of the image data input to the input unit 21 differently according to features of the voxels. This is generally called weighted PCA.

First, the plane generator 221 calculates a mean u[m] of the image data input to the input unit 21 by using Equation 2 below. In Equation 2, X[m,n] denotes an m×n matrix of the image data input to the input unit 21, wherein each column of the m×n matrix corresponds to a vector, m is a value between 1 and M, denoting a dimension of the image data input to the input unit 21, and n is a value between 1 and N, denoting the number of pieces of data.

$$u[m] = \frac{1}{N}\sum_{n=1}^{N} X[m,n] \quad (2)$$

For example, in Equation 2, m corresponds to a type of 3D coordinate values of points included in a mass or coordinate values of feature points, i.e., each of an i value, a j value, and a k value, and n corresponds to the number of the 3D coordinate values of the points included in the mass or the coordinate values of the feature points, i.e., each of the number of i values, the number of j values, and the number of k values. Thereafter, the plane generator 221 calculates a covariance matrix C from a result value of Equation 2, i.e., the mean of the image data input to the input unit 21, by using Equation 3 below. In Equation 3, E denotes an expected value operator, ⊗ denotes an outer product operator, *denotes a conjugate transpose operator, and a matrix U denotes an M×N matrix obtained by multiplying the result value of Equation 2 by a 1×N matrix of which values of all elements are 1.

$$C = E[(X-U) \otimes (X-U)] = \frac{1}{N}\sum_{n=1}^{N}(X-U)\cdot(X-U)^* \quad (3)$$

Thereafter, the plane generator 221 calculates a matrix V of eigenvectors diagonalizing a result value of Equation 3, i.e., the covariance matrix C, by using Equation 4 below. In Equation 4, a matrix D denotes a diagonal matrix of eigenvalues of the covariance matrix C. Thereafter, the plane generator 221 arranges columns of the matrix V and the matrix D in decreasing order of their eigenvalues. An eigenvector having the greatest eigenvalue from among the column vectors, i.e., the eigenvectors, of the matrix V becomes the first principal component vector, an eigenvector having the second greatest eigenvalue from among the column vectors becomes the second principal component vector, and an eigenvector having the third greatest eigenvalue from among the column vectors becomes the third principal component vector.

$$V^{-1}CV = D \quad (4)$$

The 2D image generator 222 generates at least one 2D image representing a cross section of the part of the patient's body by applying the 3D volume image data input to the input unit 21 to the at least one virtual plane generated by the plane generator 221. In more detail, the 2D image generator 222 generates a 2D image representing a cross section of the part of the patient's body by using values of voxels crossed by the virtual plane generated by the plane generator 221 from among the voxels of the 3D volume image data input to the input unit 21. Hereinafter, a process of generating a 2D image by using values of voxels crossed by a virtual plane will be described in detail.

Figure 10:
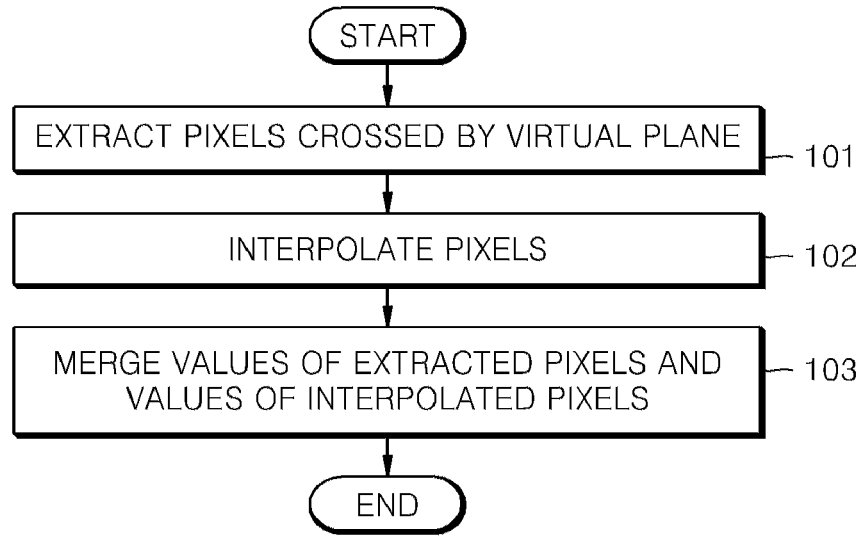
FIG. 10 is a flowchart of a process of generating a 2D image in a 2D image generator shown in FIG. 2.

FIG. 10 is a flowchart of a process of generating a 2D image in the 2D image generator 222 shown in FIG. 2. Referring to FIG. 10, the process of generating a 2D image in the 2D image generator 222 includes the following operations. In operation 101, the 2D image generator 222 extracts voxels crossed by the virtual plane generated by the plane generator 221 from among the voxels of the 3D volume image data input to the input unit 21 as pixels of the 2D image. An image having a resolution sufficient for a medical expert to perform a diagnosis may not be provided by only the voxels crossed by the virtual plane generated by the plane generator 221 from among the voxels of the 3D volume image data input to the input unit 21. Accordingly, in operation 102, the 2D image generator 222 interpolates additional pixels of the 2D image other than the pixels of the 2D image corresponding to the voxels extracted in operation 101 by using the values of the voxels of the 3D volume image data input to the input unit 21. An image having a resolution sufficient for a medical expert to perform a diagnosis may be provided through this interpolation. As described above, if an image of the 3D volume input to the input unit 21 is a monochrome image, the values of the voxels may be brightness values. In operation 103, the 2D image generator 222 generates a single 2D image by merging values of the pixels of the 2D image corresponding to the voxels extracted in operation 101 and values of the additional pixels of the 2D image interpolated in operation 102, and outputs the generated 2D image to the image feature extractor 223.

Figure 11:
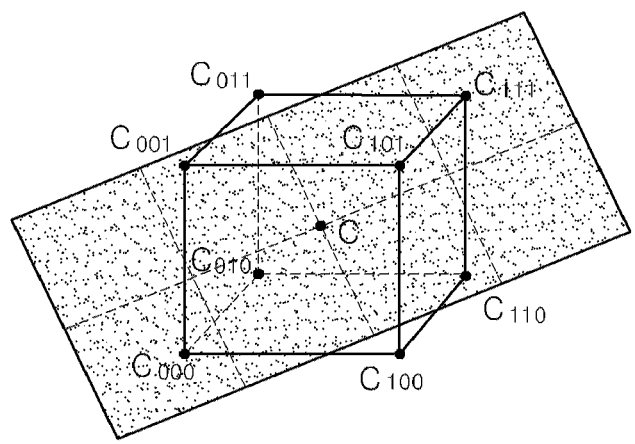
FIG. 11 shows a process of interpolating a 2D image in the 2D image generator shown in FIG. 2.
Figure 11:
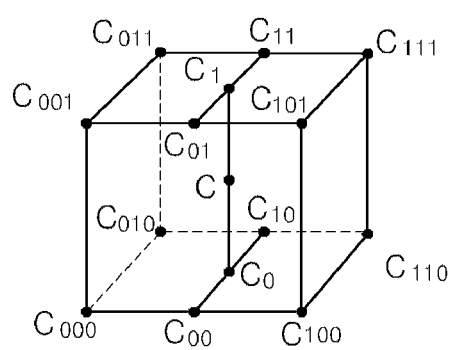

FIG. 11 shows a process of interpolating a 2D image in the 2D image generator 222 shown in FIG. 2. An interpolation method shown in FIG. 11 is a tri-linear interpolation method. However, this is only an example, and it will be understood by those of ordinary skill in the art to which the current embodiment belongs that other interpolation methods that are known in the art may be used. Referring to FIG. 11A, the 2D image generator 222 calculates a value of an interpolation pixel C on the virtual plane generated by the plane generator 221 by using values of the voxels at the 8 vertexes of a cube of which the center is the interpolation pixel C, i.e., values of $C_{000}$, $C_{100}$, $C_{010}$, $C_{110}$, $C_{001}$, $C_{101}$, $C_{011}$, and $C_{111}$. Referring to FIG. 11B, the 2D image generator 222 calculates a value of $C_{00}$ by performing a linear interpolation between $C_{000}$ and $C_{100}$, a value of $C_{01}$ by performing a linear interpolation between $C_{001}$ and $C_{101}$, a value of $C_{11}$ by performing a linear interpolation between $C_{011}$ and $C_{111}$, and a value of $C_{10}$ by performing a linear interpolation between $C_{010}$ and $C_{110}$. Thereafter, the 2D image generator 222 calculates a value of $C_0$ by performing a linear interpolation between $C_{00}$ and $C_{10}$, and calculates a value of $C_1$ by performing a linear interpolation between $C_{01}$ and $C_{11}$. Finally, the 2D image generator 222 calculates a value of C by performing a linear interpolation between $C_0$ and $C_1$.

The image feature extractor 223 extracts a feature of the 2D image generated by the 2D image generator 222 from the 2D image by calculating the feature of the 2D image using values of pixels included in the 2D image. Unlike a natural image, in a medical image, another feature may be extracted from the same 2D image according to the modality of an image, such as an ultrasound image, a Computed Tomography (CT) image, a Magnetic Resonance Imaging (MRI) image, or a Position Emission Tomography (PET) image, or according to a type of a lesion that a medical expert desires to diagnose. The image feature extractor 223 may receive information regarding the modality of such an image or the type of such a lesion from a medical expert through the user interface 25, and extract a feature of a 2D image according to the information. Alternatively, the image feature extractor 223 may extract a feature of a 2D image according to information regarding the modality of an image or the type of lesion that is stored in the storage unit 23.

A medical image has a feature that the medical image includes an area of interest to a medical expert according to the modality of the medical image or the type of lesion, and a background having a single color. Thus, a feature of a 2D image may be more correctly and efficiently extracted than before by separating the area of interest from the medical image and extracting a feature of the area. In more detail, the image feature extractor 223 extracts a feature of a 2D image by segmenting the 2D image based on values of pixels included in the 2D image according to the modality of an image or the type of lesion that is input from a medical expert or stored in the storage unit 23, and calculating features of the segmented areas using values of pixels included in the segmented areas. Hereinafter, a process of extracting a feature of a 2D image in the image feature extractor 223 will be described in detail.

Figure 12:
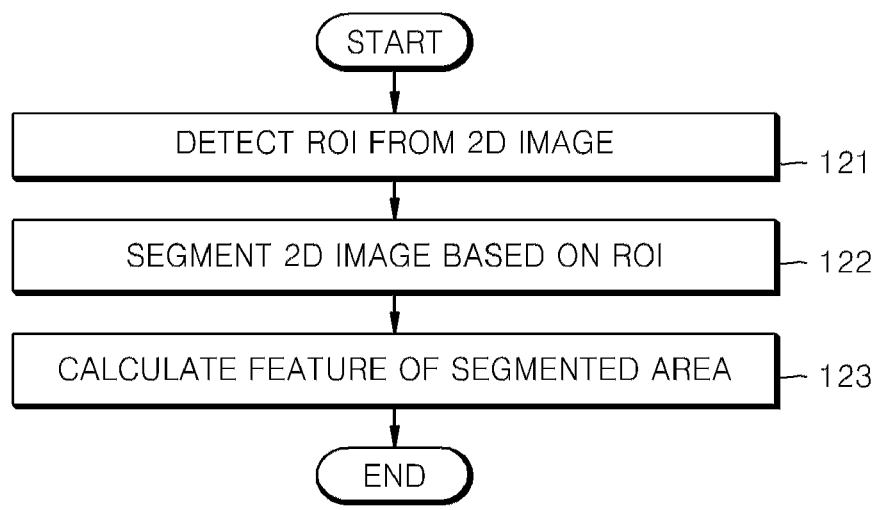
FIG. 12 is a flowchart of an image feature extracting process in an image feature extractor shown in FIG. 2.

FIG. 12 is a flowchart of an image feature extracting process in the image feature extractor 223 shown in FIG. 2. Referring to FIG. 12, the image feature extracting process in the image feature extractor 223 includes the following operations. In operation 121, the image feature extractor 223 detects at least one Region Of Interest (ROI) from the 2D image generated by the 2D image generator 222 based on the values of the pixels included in the 2D image generated by the 2D image generator 222. An ROI is commonly used in medical images. The detection of an ROI is described in detail in various papers, e.g., M. Seo et al., "ROI-Based Medical Image Retrieval Method Using Human-Perception and MPEG-7 Visual Descriptors," *Proceedings of the 5th International Conference on Image and Video Retrieval (CIVR 2006)*, Jul. 13-15, 2006, Tempe, Ariz., *Lecture Notes in Computer Science*, Vol. 4071, 2006, pp. 231-240, the contents of which are incorporated herein by reference, and M. Seo et al., "ROI-based Medical Image Retrieval Method using Human Perception and MPEG-7 Visual Descriptor," *Journal of Korean Society for Imaging Science and Technology*, Vol. 13, No. 2, June 2007, pp. 120-130, the contents of which are incorporated herein by reference. According to the detection method disclosed in these papers, the image feature extractor 223 detects at least one ROI from the 2D image generated by the 2D image generator 222 based on a visual characteristic that is perceivable by a human of the values of the pixels included in the 2D image generated by the 2D image generator 222.

In operation 122, the image feature extractor 223 segments the 2D image generated by the 2D image generator 222 based on the ROI detected in operation 121. Image segmentation is a well-known technique in the computer vision art, and is a process of allocating a label to each pixel in an image in order for pixels sharing a predetermined visual characteristic to have the same label. A set of pixels having the same or similar labels becomes a single segmented area. The image feature extractor 223 allocates a label to each pixel in an image in order for pixels having values sharing a visual characteristic determined by the modality of an image or the type of lesion that is input from a medical expert or stored in the storage unit 23, in the ROI detected in operation 121 to have the same label. For example, if the type of lesion is cancer, a visual characteristic of cancer is a very dark brightness value. Image segmentation is described in detail in various papers, e.g., D. Pham et al., "Current Methods in Medical Image Segmentation," *Annual Review of Biomedical Engineering*, Volume 2, August 2000, pp. 315-337, the contents of which are incorporated hereby by reference.

Figure 13A:
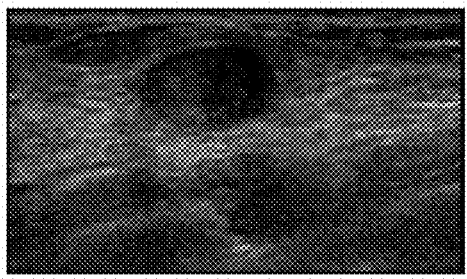
FIGS. 13A-13C show an example of an image segmented by the image feature extractor shown in FIG. 2.
Figure 13B:
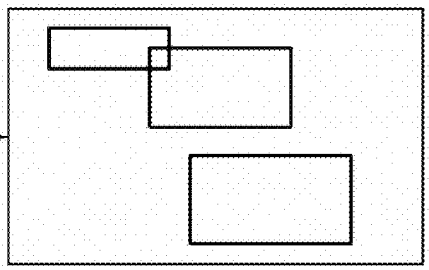
Figure 13C:
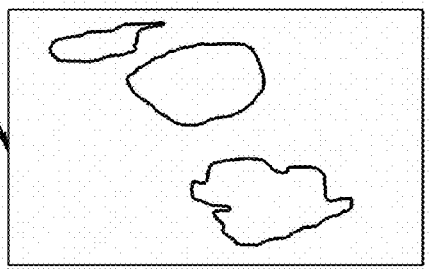

FIGS. 13A-13C show an example of an image segmented by the image feature extractor 223 shown in FIG. 2. FIG. 13A shows an example of the 2D image output from the 2D image generator 222. FIG. 13B shows an example of ROIs detected by the image feature extractor 223. FIG. 13C shows an example of areas segmented by the image feature extractor 223. As shown in FIGS. 13A-13C, in general, while each ROI is represented by a rough boundary of an area having a medical meaning, each segmented area is precisely delineated. Accordingly, a computation amount required for detecting each ROI is less than a computation amount required for the image segmentation. Thus, in the embodiment shown in FIG. 12, to efficiently segment an image, a ROI is first detected from a 2D image, and then a segmented area is generated based on the detected ROI. Alternatively, in operation 122, the image feature extractor 223 may directly segment the 2D image generated by the 2D image generator 222 by omitting the ROI detection operation in operation 121.

In operation 123, the image feature extractor 223 calculates a feature of the area segmented in operation 122 by using values of pixels included in the segmented area. Alternatively, the image feature extractor 223 may calculate a feature of the ROI by using values of pixels included in the ROI detected in operation 121. However, since the ROI is represented by a rough boundary of an area having medical significance, the feature of the ROI may have lower accuracy than the feature of the segmented area in representing an area having medical significance. For example, the following values may be used as a feature of a 2D medical image. The feature of a 2D medical image may be classified into a morphological feature and a texture feature. The morphological feature is a value for representing morphological information, such as a shape, size, or winding of a lesion area, i.e., the number of windings or symmetry of the area, generated in operation 121 or 122. Here, the winding of the lesion area means part bent beyond a threshold angle among from contours of the lesion area. Accordingly, the number of windings of the lesion area is the number of parts bent beyond a threshold angle among from contours of the lesion area. The texture feature is a value for representing texture information of the lesion area, i.e., a mean, variance, or frequency value of the area.

For example, the image feature extractor 223 may calculate the number of windings or symmetry of the area segmented in operation 122 or the ROI detected in operation 121 based on differences between brightness values of pixels included in the segmented area or the detected ROI. The image feature extractor 223 may also calculate a mean or variance of the area segmented in operation 122 or the ROI detected in operation 121 by calculating a mean or variance of values of pixels included in the segmented area or the detected ROI. The image feature extractor 223 may also calculate frequency values of the pixels included in the area segmented in operation 122 or the ROI detected in operation 121 by transforming values of the pixels included in the segmented area or the detected ROI in the time domain to values in the frequency domain using the DCT, and calculate a frequency value of the segmented area or the detected ROI by summing the calculated frequency values. A feature of a 2D image may be represented by a feature vector in a form of a 1D matrix. For example, a feature vector of the area segmented in operation 122 or the ROI detected in operation 121 may be represented by a 1D matrix in which the elements are the calculated values, i.e., a 1D matrix (mean, variance, frequency value, the number of windings, symmetry).

There may be a plurality of areas segmented in operation 122 or ROIs detected in operation 121. In this case, the image feature extractor 223 may calculate feature vectors of the plurality of areas (or ROIs) and determine a feature vector of the 2D image output from the 2D image generator 222 from a combination of the feature vectors. For example, the image feature extractor 223 may merge the feature vectors of the plurality of areas according to locations of the plurality of areas and determine the merged vector as a feature vector of the 2D image. The merging may be performed by sequentially arranging the feature vectors from a feature vector of an area located at the right in the 2D image. Alternatively, the image feature extractor 223 may sum the feature vectors of the plurality of areas and determine the summed vector as a feature vector of the 2D image, or the image feature extractor 223 may determine a vector having the greatest value from among the feature vectors of the plurality of areas as a feature vector of the 2D image.

Figure 14:
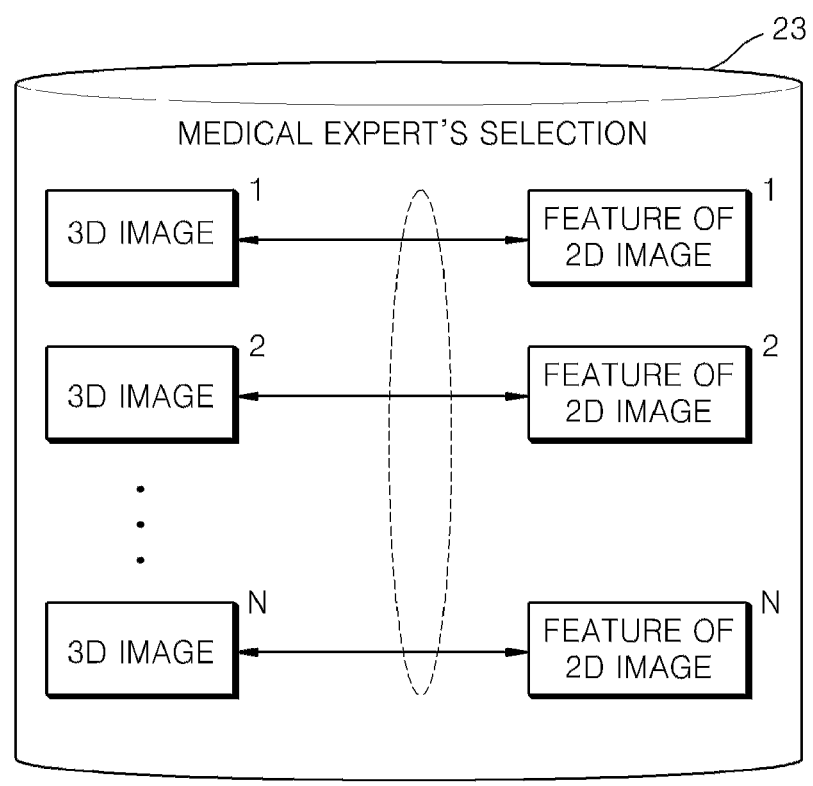
FIG. 14 shows a data storage form of a storage unit shown in FIG. 2.

FIG. 14 shows a data storage form of the storage unit 23 shown in FIG. 2. Referring to FIG. 14, a plurality of 3D images and a plurality of 2D images are one-to-one mapped to each other and stored in the storage unit 23. If a medical expert selects a 2D image most suitable for diagnosis of a patient from among 2D images generated from a predetermined 3D image, i.e., an image of a 3D volume input to the input unit 21, a feature of the 2D image and the 3D image are mapped to each other and stored in the storage unit 23. A feature of a 2D medical image most suitable for a diagnosis of a patient, i.e., a target feature, may vary according to an opinion of a medical expert, such as a type of lesion that the medical expert desires to diagnose. In the storage unit 23, mapping information of the 3D images and features of the 2D images in which medical experts' opinions are reflected may be stored in the form shown in FIG. 14. A 3D image corresponding to a 2D image may be searched for in the storage unit 23 by using the features of the 2D images stored in the storage unit 23. Alternatively, a feature of a 2D image corresponding to a 3D image stored in the storage unit 23 may be searched for, or the 2D image having the feature may be searched for. To search for a 2D image, 2D images having may be stored in the storage unit 23 together with the features of the 2D images.

The target feature generator 224 generates a target feature of a 2D image corresponding to an image of a 3D volume input to the input unit 21 based on mapping between the plurality of 3D images and the features of the plurality of 2D images stored in the storage unit 23. In particular, the target feature generator 224 trains a model representing relationships between the plurality of 3D images and the features of the plurality of 2D images based on mapping between the plurality of 3D images and the features of the plurality of 2D images stored in the storage unit 23, and generates a target feature of a 2D image corresponding to an image of a 3D volume input to the input unit 21 by using the trained model. To model complex relationships between an input and an output, a neural network is widely used. Hereinafter, a process of generating a target feature of a 2D image by using a neural network will be described in detail. The neural network may also be used to obtain information regarding the modality of an image or a type of lesion corresponding to an image of a 3D volume input to the input unit 21 besides the target feature of the 2D image. The modality of an image or the type of lesion corresponding to the image of a 3D volume may be trained from information selected by previous medical experts. As described above, such information may be stored in the storage unit 23 and used by the image feature extractor 223. However, it will be understood by those of ordinary skill in the art to which the embodiment described below belongs that other mathematical models that are known in the art besides the neural network may be used.

Figure 15:
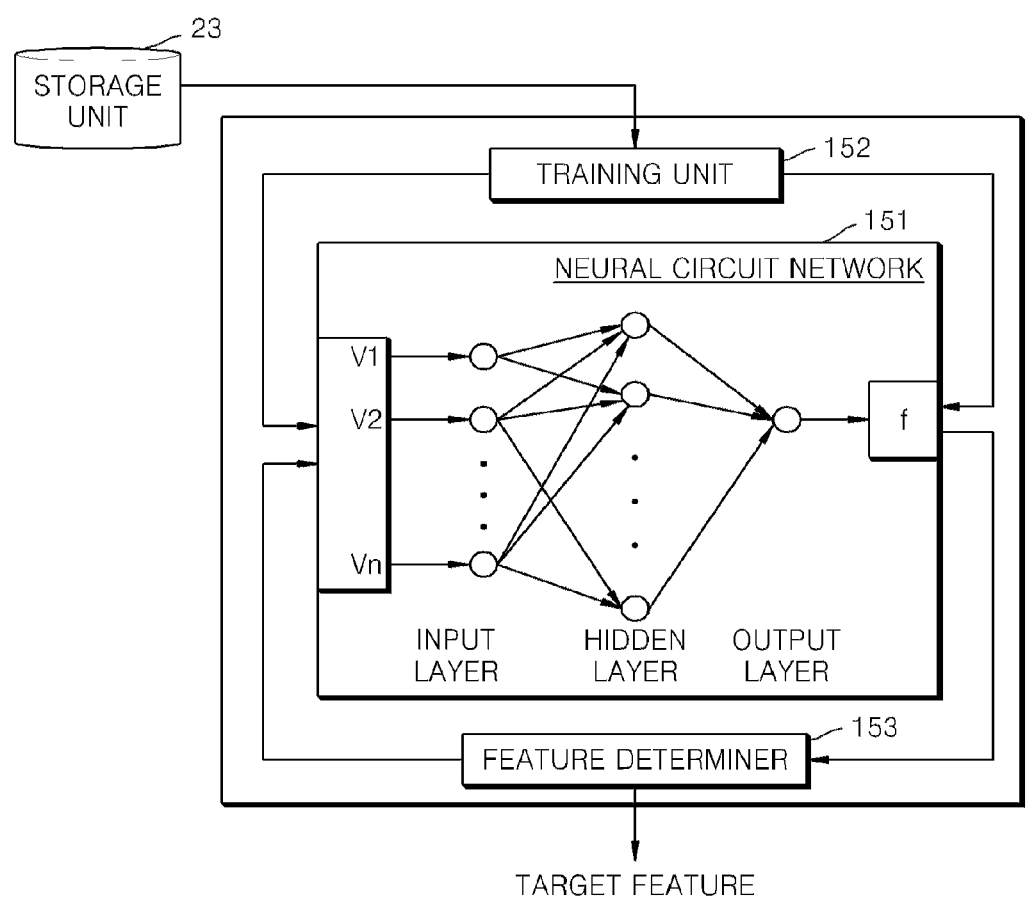
FIG. 15 is a detailed block diagram of a target feature generator shown in FIG. 2.

FIG. 15 is a detailed block diagram of the target feature generator 224 shown in FIG. 2. Referring to FIG. 15, the target feature generator 224 includes a neural circuit network 151, a training unit 152, and a feature determiner 153. The neural circuit network 151 has a layer structure in which at least one intermediate layer (hidden layer) exists between an input layer and an output layer. The hidden layer in the neural circuit network 151 has weights representing complex relationships between an input and an output. When input data and output data are applied to the input layer and the output layer of the neural circuit network 151, respectively, the training of the neural circuit network 151 may be performed by adjusting the weights of the hidden layer so that the input data produces the output data. If predetermined data is input to the input layer of the neural circuit network 151 for which the training has been completed, output data predicted through the training is output from the output layer of the neural circuit network 151.

The training unit 152 may train the neural circuit network 151 by inputting a single 3D image to the input layer of the neural circuit network 151 and inputting a feature of a 2D image mapped to the 3D image to the output layer of the neural circuit network 151, and adjusting the weights of the hidden layer so that the input 3D image produces the output 2D image feature. The training unit 152 may repeat the above-described training process for all of the 3D images and the features of the 2D images stored in the storage unit 23. In general, since a product using a neural network uses a neural network for which training has been completed, the training unit 152 may be applied to only a manufacturing process of the embodiment shown in FIG. 2. However, mapping information regarding a 3D image currently input to the input unit 21 and a feature of a 2D image determined as a final image may also be used for the training of the neural circuit network 151 during use of the embodiments shown in FIG. 2.

When the feature determiner 153 inputs a 3D image currently input to the input unit 21 to the neural circuit network 151, the neural circuit network 151 outputs a feature of a 2D image corresponding to the currently input 3D image based on information trained up until the present. The feature determiner 153 determines the feature output from the neural circuit network 151 as a target feature of the 2D image. The 3D image input to the neural circuit network 151 is input as values of voxels of 3D volume image data, and the feature output from the neural circuit network 151 is output as a feature vector of the 2D image.

The final image determiner 225 calculates a similarity between the target feature generated by the target feature generator 224 and the feature of the 2D image extracted by the image feature extractor 223, and determines a 2D image having the highest similarity among the at least one 2D image generated by the 2D image generator 222 as a final image.

Figure 16:
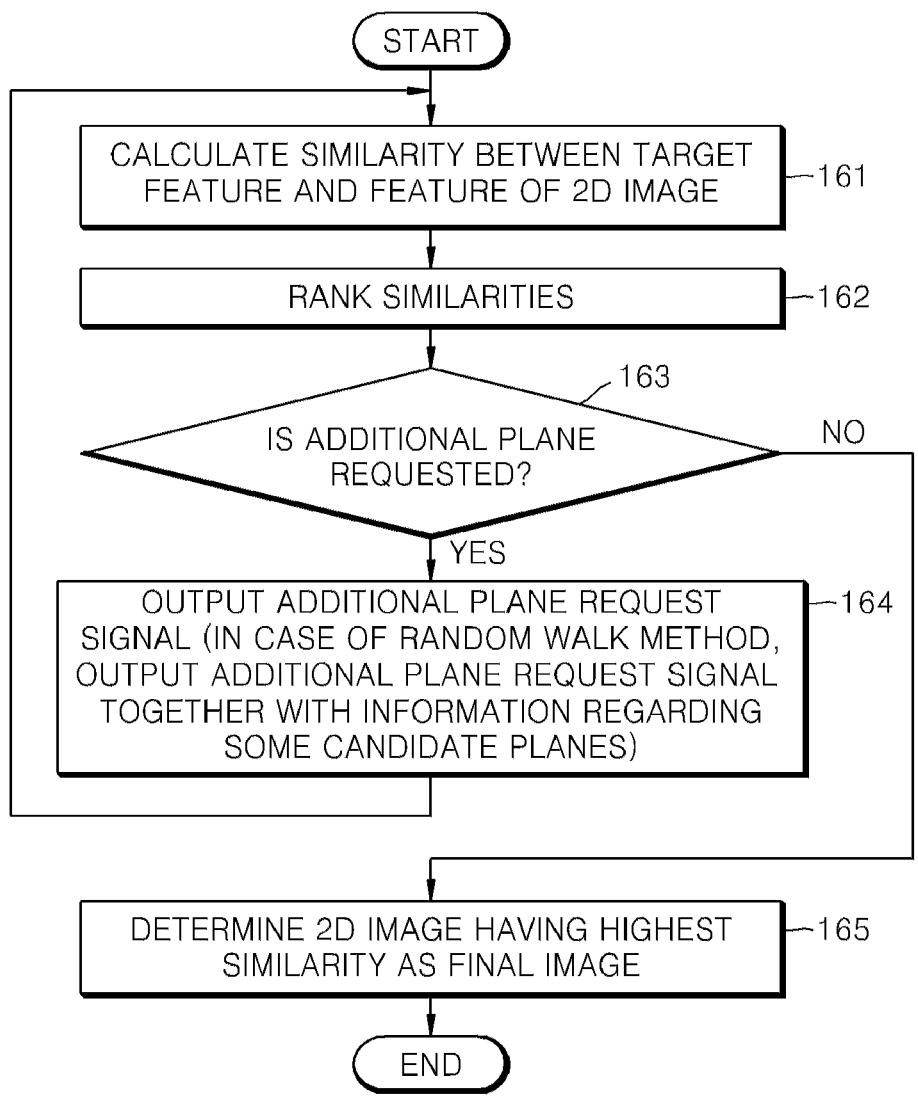
FIG. 16 is a flowchart of a process of determining a final image in a final image determiner shown in FIG. 2.

FIG. 16 is a flowchart of a process of determining a final image in the final image determiner 225 shown in FIG. 2. Referring to FIG. 16, the process of determining a final image in the final image determiner 225 includes the following operations. In operation 161, the final image determiner 225 calculates a similarity between the target feature generated by the target feature generator 224 and the feature of the 2D image extracted by the image feature extractor 223. Since the target feature generated by the target feature generator 224 and the feature of the 2D image extracted by the image feature extractor 223 are represented by vectors, the final image determiner 225 calculates a similarity between a target feature vector and the feature vector of the 2D image extracted by the image feature extractor 223. For example, the similarity between the vectors may be calculated by calculating an inner product of the vectors.

In operation 162, the final image determiner 225 ranks at least one similarity calculated in operation 161 based on the magnitude of the at least one similarity calculated in operation 161, maps the at least one similarity to at least one 2D image in the ranked order, and stores the mapped similarity and the 2D image in the storage unit 23. In operation 163, the final image determiner 225 determines whether to request an additional plane based on the at least one similarity calculated in operation 161, and proceeds to operation 164 or operation 165 according to a result of the determination. That is, if the final image determiner 225 determines to request an additional plane from the plane generator 221, the final image determiner 225 proceeds to operation 164. Otherwise, the final image determiner 225 proceeds to operation 165. In operation 164, the final image determiner 225 outputs a signal for requesting an additional plane to the plane generator 221. In operation 165, the final image determiner 225 determines a 2D image having the highest similarity among the at least one similarity ranked in operation 162 as a final image. The 2D image determined as the final image is stored in the storage unit 23 together with a mark indicating that it is the final image. The final image may be changed to another 2D image according to a user's input information input through the user interface 25. The 3D volume image data input to the input unit 21 and the 2D image determined as the final image may be used for the training of the neural circuit network 151, and a 2D image selection opinion of the user may be reflected in the training of the neural circuit network 151.

For example, in the case of the full search method shown in FIG. 4, the final image determiner 225 may determine whether to request an additional plane from the plane generator 221 according to whether similarities of all possible planes crossing the 3D volume have been calculated in operation 161. That is, if similarities of all possible planes crossing the 3D volume have been calculated in operation 161, an additional plane is not requested. Otherwise, an additional plane is requested. As another example, the final image determiner 225 may preset the number of all possible planes crossing the 3D volume according to the above-described units u1 and u2, and request additional planes if the number of planes that has been generated is less than the preset number of planes.

In the case of the random walk method shown in FIG. 5, the final image determiner 225 may determine whether to request an additional plane from the plane generator 221 according to differences between similarities of the N candidate planes calculated in operation 161. That is, if the maximum difference between the similarities of the N candidate planes calculated in operation 161 is equal to or less than a threshold, it is determined that a search space is not further reduced, and an additional plane is not requested. Otherwise, an additional plane is requested. If an additional plane is requested in the random walk method, in operation 164, the final image determiner 225 may select some candidate planes having higher similarity than others among the candidate planes by referring to the similarities of the N candidate planes calculated in operation 161, and output information regarding the selected candidate planes and an additional plane request signal to the plane generator 221. For example, if similarities of 4 candidate planes are calculated in operation 161, the final image determiner 225 may select 2 candidate planes having higher similarity than the other 2 candidate planes.

In the case of the principal component search method shown in FIG. 7, the final image determiner 225 may determine whether to request an additional plane from the plane generator 221 according to a change in the similarities calculated in operation 161. In more detail, if a change pattern of the similarities calculated in operation 161 indicates that there is no possibility of searching for a plane having a similarity higher than the calculated similarities, the final image determiner 225 may not request an additional plane. Otherwise, the final image determiner 225 may request an additional plane. For example, by using a hill climbing method, for example, the final image determiner 225 may determine whether to request an additional plane from the plane generator 221. The hill climbing method is a kind of a local search technique of searching for an optimal solution by starting with an arbitrary solution for a predetermined problem and gradually changing elements influencing a solution. However, the final image determiner 225 may use other methods that are known in the art to determine whether to request an additional plane from the plane generator 221.

That is, the final image determiner 225 may sequentially calculate similarities of planes generated as shown in FIG. 7, such as a plane including the first principal component vector and the second principal component vector, planes generated by parallel moving this plane in a direction of the third principal component vector, and planes generated by rotating a plane including the first principal component vector about an axis of the first principal component vector. The principal component search may be performed based on a case of increasing a change in similarities by the maximum gradient value from among the parallel moving case and the rotating case described above. To do this, like the random walk method, the final image determiner 225 may output information regarding a generation pattern of planes for which a change in similarities increases by the maximum gradient value and an additional plane request signal to the plane generator 221. If the change in similarities decreases negatively or there is no change in similarities, the final image determiner 225 may determine a plane having the highest similarity among similarities calculated up until the present as an optimal plane without requesting an additional plane.

The output unit 24 may select an output method of a 2D image determined as a final image by the final image determiner 225 according to selection information of a medical expert that is input through the user interface 25, read at least one 2D image from the storage unit 23 according to the selected output method, and output the at least one 2D image to the image display apparatus 30. Examples of the output method of a 2D image are a method of sequentially outputting 2D images stored in the storage unit 23 according to a magnitude order of similarities, a method of outputting planes generated by parallel moving a plane of the 2D image determined as the final image by the final image determiner 225, and a method of outputting planes generated by rotating the plane of the 2D image determined as the final image by the final image determiner 225. A medical expert may select another image different from the 2D image determined as the final image by the final image determiner 225 as a final image after watching 2D images displayed on the image display apparatus 30. If the final image is changed by the medical expert, the mark indicating the final image is removed from the 2D image stored as the final image in the storage unit 23, and a mark indicating the final image is attached to the 2D image selected by the medical expert stored in the storage unit 23.

Figure 17:
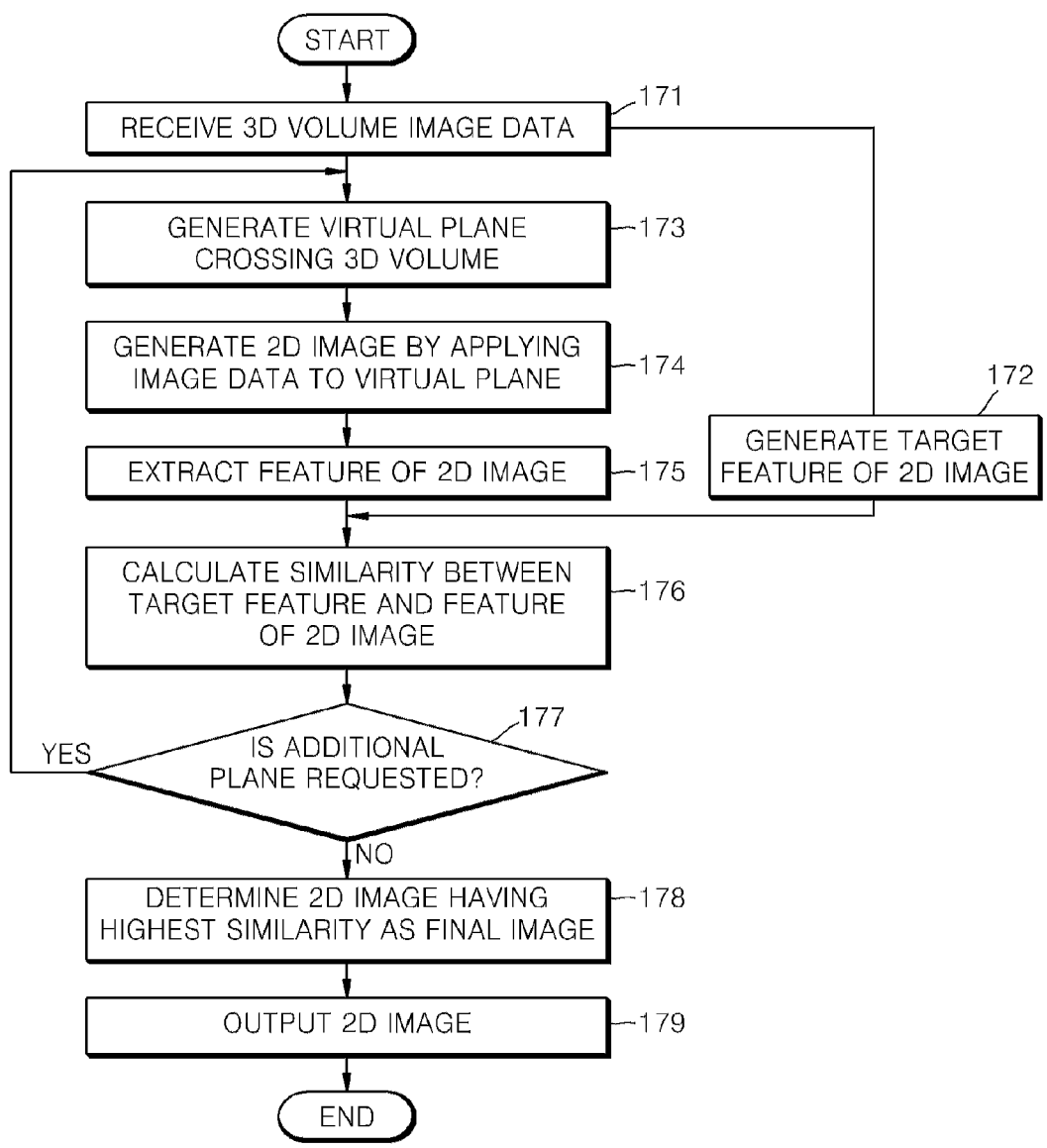
FIG. 17 is a flowchart of a method of generating a 2D image according to an embodiment of the invention.

FIG. 17 is a flowchart of a method of generating a 2D image according to an embodiment of the invention. Referring to FIG. 17, the 2D image generating method includes operations sequentially processed by the 2D image generating apparatus 20 shown in FIG. 2. Thus, although omitted hereinafter, the description of the 2D image generating apparatus 20 above is also applicable to the 2D image generating method shown in FIG. 17.

In operation 171, the 2D image generating apparatus 20 receives 3D volume image data for showing a part of a patient's body in a 3D manner from the 3D image detecting apparatus 10. In operation 172, the 2D image generating apparatus 20 generates a target feature of a 2D image corresponding to the image of the 3D volume input to the input unit 21 based on mapping between a plurality of 3D images and features of a plurality of 2D images stored in the storage unit 23. In operation 173, the 2D image generating apparatus 20 generates a virtual plane crossing the 3D volume from the 3D volume image data received in operation 171. In operation 174, the 2D image generating apparatus 20 generates a 2D image representing a cross section of the part of the patient's body by applying the 3D volume image data input in operation 171 to the virtual plane generated in operation 173. In operation 175, the 2D image generating apparatus 20 extracts a feature of the 2D image generated in operation 174 from the 2D image by calculating the feature of the 2D image using values of pixels included in the 2D image.

In operation 176, the 2D image generating apparatus 20 calculates a similarity between the target feature generated in operation 172 and the feature of the 2D image extracted in operation 175. In operation 177, the 2D image generating apparatus 20 determines whether to request an additional plane based on the similarity calculated in operation 176. If it is determined that an additional plane is to be requested, the 2D image generating apparatus 20 proceeds back to operation 173. Otherwise, the 2D image generating apparatus 20 proceeds to operation 178. If the 2D image generating apparatus 20 proceeds back to operation 173, the 2D image generating apparatus 20 generates another plane different from the previously generated plane in operation 173 and repeats operations 173 to 176 until the 2D image generating apparatus 20 determines not to request an additional plane. In operation 178, the 2D image generating apparatus 20 determines a 2D image having the highest similarity among the at least one 2D image generated in operation 174 as a final image. In operation 179, the 2D image generating apparatus 20 reads at least one 2D image from the storage unit 23 according to a final image output method selected by a medical expert, and outputs the at least one 2D image to the image display apparatus 30.

As described above, according to one or more of the above embodiments of the invention, a 2D image most suitable for the diagnosis of a patient may be automatically extracted from a 3D image output from the 3D image detecting apparatus 10, such as an ultrasonography machine, and provided to a medical expert. Although a 2D image of an arbitrary cross section selected by a medical expert from a 3D image has been provided, this may not be a 2D image most suitable for the diagnosis of a patient. Since a 2D image most suitable for the diagnosis of a patient is searched for by using various methods, such as the full search method, the random walk method, and the principal component search method, in the embodiments described above, a time taken for a medical expert to search for a 2D image most suitable for the diagnosis of a patient from a 3D image may be significantly reduced. In addition, according to one or more of the above embodiments of the invention, a 2D image desired by a medical expert may be exactly provided based on a training result of relationships between a 3D image in which a medical expert's opinion is reflected and a feature of a 2D image.

In addition, one or more of the above embodiments of the invention may be more effective than methods of using a 3D image as follows. First, since a 2D image automatically extracted from a 3D image according to one or more of the above embodiments of the invention may be compared with 2D images captured in the past, medical historical diagnosis, which involves performing diagnosis by referring to a progress history of a lesion, may be performed through this comparison. Second, methods used to diagnose 2D images may be applied to a 2D image automatically extracted from a 3D image according to one or more of the above embodiments of the invention without any change. Third, noise occurring in a 3D image may be cancelled in a 2D image automatically extracted from the 3D image according to one or more of the above embodiments of the invention. When a 3D image is transformed to a 2D image, an amount of data is reduced, resulting in a decrease in noise. In particular, when noise occurs in a predetermined direction in the 3D image, a probability is high that a plane corresponding to the predetermined direction will not be selected for use in generating the 2D image, so the noise may be cancelled.

The 2D image generating method shown in FIG. 17 can be written as a computer program for controlling a computer to perform the method, and can be implemented by a general-use digital computer that executes the computer program using a non-transitory computer-readable recording medium that stores the computer program. Examples of a non-transitory computer-readable recording medium include storage media, such as magnetic storage media (e.g., ROM, floppy disks, hard disks, etc.) and optical recording media (e.g., CD-ROMs, or DVDs).

Although several embodiments of the invention have been shown and described, it will be understood by those of ordinary skill in the art that various changes in form and details may be made in these embodiments without departing from the spirit and scope of the invention as defined by the claims and their equivalents. The embodiments described herein should be considered in a descriptive sense only, and not for purposes of limitation. Descriptions of features or aspects within each embodiment should typically be considered as being applicable to other similar features or aspects in other embodiments.

What is claimed is:

1. A method of generating a 2-dimensional (2D) image, the method comprising:
   receiving 3-dimensional (3D) volume image data for showing a part of a patient's body in a 3D manner;
   generating at least one virtual plane crossing the 3D volume by searching for a plane in 3D space and selecting the at least one virtual plane from among a plurality of planes in the 3D space as most optimal;
   generating at least one 2D image representing a cross section of the part of the patient's body by applying the 3D volume image data to the at least one virtual plane; and
   outputting a 2D image having a feature most similar to a target feature from among the at least one 2D image,
   wherein the generating of the at least one virtual plane comprises repeating a number of times a process of generating candidate planes crossing the 3D volume, selecting some candidate planes from among the generated candidate planes, and generating new candidate planes in a range of the selected candidate planes.

2. The method of claim 1, wherein the generating of the at least one virtual plane comprises sequentially generating planes crossing the 3D volume by sequentially changing coefficient values of a plane equation.

3. The method of claim 1, wherein the generating of the at least one virtual plane comprises generating the at least one virtual plane according to a change pattern of the 3D volume image data in a 3D space by performing a principal component analysis (PCA) on the 3D volume image data.

4. The method of claim 3, wherein the generating of the at least one virtual plane by performing the PCA comprises:
   calculating a first principal component vector corresponding to an axis in a direction in which a change in the 3D volume image data is the greatest in the 3D space by performing the PCA; and
   generating the at least one virtual plane based on the first principal component vector.

5. The method of claim 3, wherein the generating of the at least one virtual plane by performing the PCA comprises:
   determining feature points having a feature among voxels of the 3D volume image data in the 3D space based on values of the voxels; and
   generating the at least one virtual plane from a distribution of the feature points in the 3D space by performing the PCA.

6. The method of claim 3, wherein the generating of the at least one virtual plane by performing the PCA comprises:
   detecting a mass included in the 3D volume image data based on values of voxels of the 3D volume image data in the 3D space; and
   generating the at least one virtual plane from a distribution of points included in the mass in the 3D space by performing the PCA.

7. The method of claim 1, wherein the generating of the at least one 2D image comprises generating the at least one 2D image by using values of voxels crossed by the virtual plane from among voxels of the 3D volume image data.

8. The method of claim 7, wherein the generating of the at least one 2D further comprises:
- extracting voxels crossed by the virtual plane from among voxels of the 3D volume image data as pixels of the 2D image;
- interpolating additional pixels of the 2D image other than the pixels of the 2D image corresponding to the extracted voxels by using values of the voxels of the 3D volume image data; and
- generating the at least one 2D image by merging values of the pixels of the 2D image corresponding to the extracted voxels and values of the interpolated additional pixels of the 2D image.

9. The method of claim 1, further comprising extracting a feature of the at least one 2D image by using values of pixels included in the at least one 2D image.

10. The method of claim 9, wherein the extracting of the feature of the at least one 2D image comprises:
- extracting the feature of the at least one 2D image by segmenting the at least one 2D image based on the values of the pixels included in the at least one 2D image; and
- calculating a feature of the segmented area by using values of pixels included in the segmented area.

11. The method of claim 1, further comprising:
- calculating a similarity between the target feature and the at least one 2D image; and
- determining a 2D image having a highest similarity among the at least one 2D image as a final image;
- wherein the outputting of the 2D image comprises outputting the 2D image determined as the final image.

12. The method of claim 1, further comprising generating a target feature of a 2D image corresponding to an image of the 3D volume based on mapping between a plurality of 3D medical images and features of a plurality of 2D medical images.

13. The method of claim 12, wherein the generating of the target feature of the 2D image comprises:
- training a model representing relationships between the plurality of 3D medical images and the features of the plurality of 2D medical images based on the mapping; and
- generating a target feature of a 2D image corresponding to the image of the 3D volume by using the trained model.

14. The method of claim 13, wherein the generating of the target feature of the 2D image comprises training the model by using the 3D volume image data and the 2D image having the feature most similar to the target feature.

15. The method of claim 14, wherein the generating of the target feature of the 2D image comprises, if the 2D image having the feature most similar to the target feature is changed to another 2D image according to a user's input information, training the model by using the 3D volume image data and the changed 2D image.

16. A non-transitory computer-readable recording medium storing a computer program for controlling a computer to perform a method of generating a 2-dimensional (2D) image, the method comprising:
- receiving 3-dimensional (3D) volume image data for showing a part of a patient's body in a 3D manner;
- generating at least one virtual plane crossing the 3D volume by searching for a plane in 3D space and selecting the at least one virtual plane from among a plurality of planes in the 3D space as most optimal;
- generating at least one 2D image representing a cross section of the part of the patient's body by applying the 3D volume image data to the at least one virtual plane; and
- outputting a 2D image having a feature most similar to a target feature from among the at least one 2D image,
- wherein the generating of the at least one virtual plane comprises repeating a number of times a process of generating candidate planes crossing the 3D volume, selecting some candidate planes from among the generated candidate planes, and generating new candidate planes in a range of the selected candidate planes.

17. An apparatus for generating a 2-dimensional (2D) image, the apparatus comprising:
- an input unit configured to receive 3-dimensional (3D) volume image data for showing a part of a patient's body in a 3D manner;
- an image processor configured to:
  - generate at least one virtual plane crossing the 3D volume by searching for a plane in a 3D space and selecting the at least one virtual plane from among a plurality of planes in the 3D space as most optimal; and
  - generate at least one 2D image representing a cross section of the part of the patient's body by applying the 3D volume image data to the at least one virtual plane; and
- output a 2D image having a feature most similar to a target feature from among the at least one 2D image,
- wherein the image processor repeats a number of times a process of generating candidate planes crossing the 3D volume, selects some candidate planes from among the generated candidate planes, and generates new candidate planes in a range of the selected candidate lanes.

18. The apparatus of claim 17, further comprising a storage unit configured to store the 3D volume image data and the 2D image having the feature most similar to the target feature mapped to each other.

* * * * *